(12) United States Patent
Lee et al.

(10) Patent No.: US 12,395,082 B2
(45) Date of Patent: Aug. 19, 2025

(54) SWITCHING REGULATOR WITH QUICK START CIRCUIT CONFIGURED TO CHARGE AND DISCHARGE A CAPACITOR TO CONTROL A POWER MODE

(71) Applicant: NXP B.V., Eindhoven (NL)

(72) Inventors: Jang Hyuck Lee, Sungnam-si (KR); Seongnam Kim, Namyangju-si (KR)

(73) Assignee: NXP B.V., Eindhoven (NL)

( * ) Notice: Subject to any disclaimer, the term of this patent is extended or adjusted under 35 U.S.C. 154(b) by 222 days.

(21) Appl. No.: 18/351,872

(22) Filed: Jul. 13, 2023

(65) Prior Publication Data

US 2025/0023475 A1 Jan. 16, 2025

(51) Int. Cl.
| H02M 3/158 | (2006.01) |
| H02M 1/00 | (2007.01) |
| H02M 1/088 | (2006.01) |
| H02M 1/36 | (2007.01) |

(52) U.S. Cl.
CPC ....... H02M 3/1584 (2013.01); H02M 1/0025 (2021.05); H02M 1/088 (2013.01)

(58) Field of Classification Search
CPC .. H02M 3/158; H02M 3/1584; H02M 3/1566; H02M 1/0032; H02M 1/0088; H02M 1/36

See application file for complete search history.

(56) References Cited

U.S. PATENT DOCUMENTS

| 6,127,815 A | 10/2000 | Wilcox |
| 6,366,066 B1 | 4/2002 | Wilcox |
| 9,471,077 B2 | 10/2016 | Kobayashi |
| 9,729,057 B1 | 8/2017 | Goenawan et al. |
| 10,554,124 B1* | 2/2020 | Mangudi ................. H02M 1/08 |
| 10,666,139 B1* | 5/2020 | Zhang ................... H02M 3/156 |
| 2009/0322299 A1* | 12/2009 | Michishita ............ H02M 3/156 |
| | | 323/282 |
| 2014/0217999 A1* | 8/2014 | Wibben ................. G05F 1/468 |
| | | 323/282 |
| 2015/0061618 A1 | 3/2015 | Archibald |
| 2015/0061626 A1* | 3/2015 | Archibald ................ G06F 1/26 |
| | | 323/282 |
| 2016/0124447 A1* | 5/2016 | Kobayashi .............. G05F 1/575 |
| | | 323/280 |

(Continued)

FOREIGN PATENT DOCUMENTS

| EP | 1681760 A2 | 7/2006 |
| EP | 1681760 A3 | 4/2008 |
| EP | 4191871 A1 | 6/2023 |

*Primary Examiner* — Sisay G Tiku

(57) ABSTRACT

One example discloses a switching regulator circuit, comprising: a power supply input (Vin); a voltage reference (Vref); a power output (Vout); a high-side switch coupled between the power supply input (Vin) and the power output (Vout); a low-side switch coupled between a ground reference (GND) and the power output (Vout); a driver circuit coupled to the high-side switch and the low-side switch; a low-power comparator (COMP1) coupled to receive the voltage reference (Vref) and the power output (Vout); a high-power comparator (COMP2) having a first input and a second input; wherein the first input is coupled to a compensation capacitor (CC) and a first switch (SW1); wherein the second input is coupled to a current sense ramp; wherein the current sense ramp is coupled to the power output (Vout).

20 Claims, 8 Drawing Sheets

(56) References Cited

U.S. PATENT DOCUMENTS

2017/0237345 A1* 8/2017 Manlove ............... H02M 3/156
                                                              323/274
2020/0119633 A1   4/2020 Borghese et al.
2020/0403510 A1* 12/2020 Nonaka .................. H02M 1/36
2023/0122410 A1*  4/2023 Fan ..................... H02M 1/0025
                                                              323/271

* cited by examiner

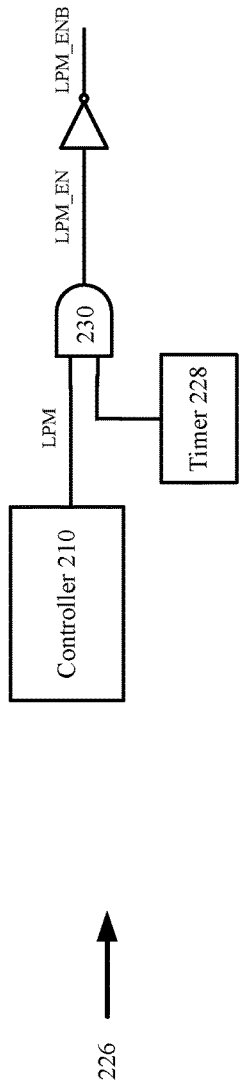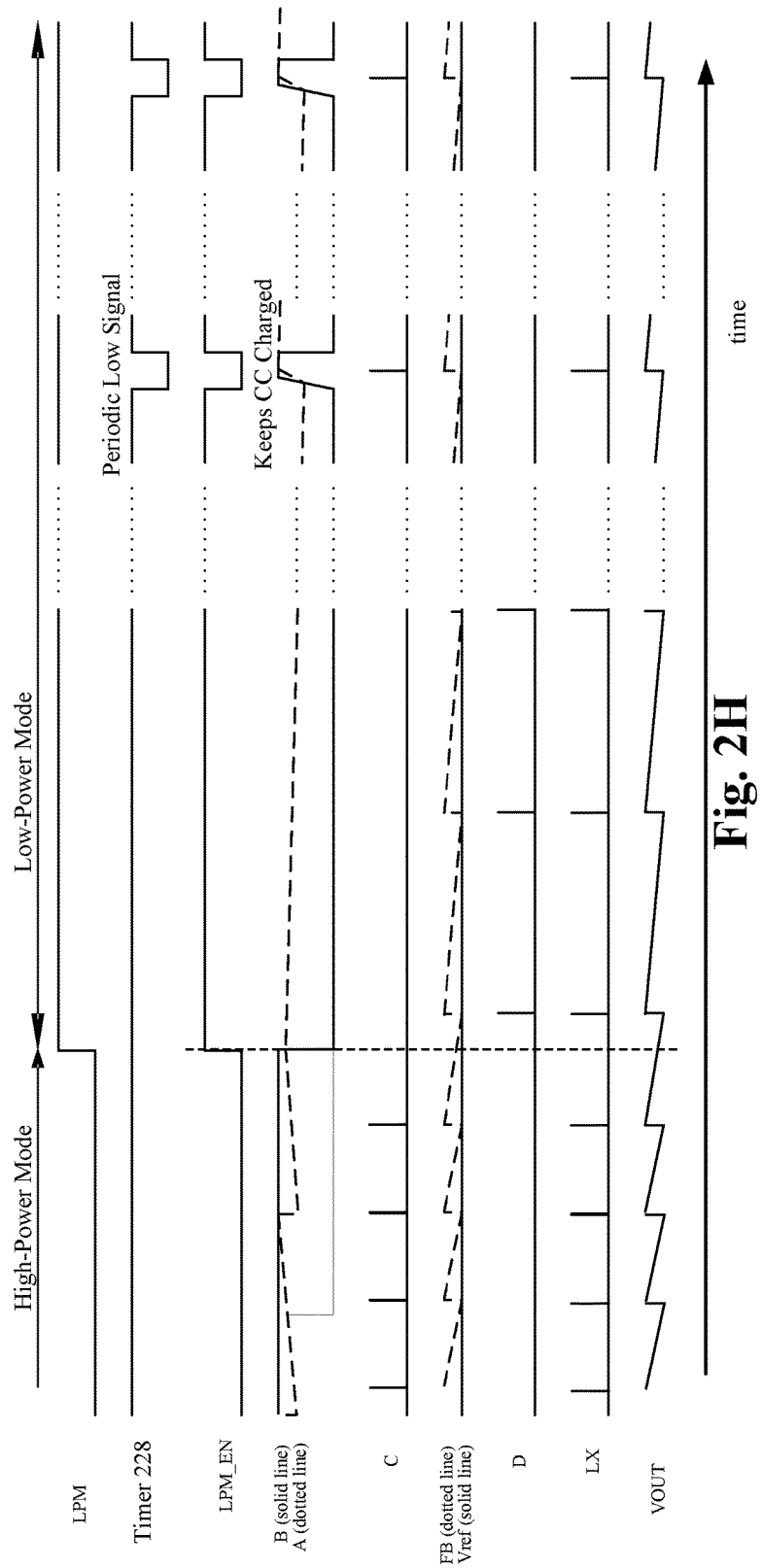
Fig. 2G
Fig. 2H

SWITCHING REGULATOR WITH QUICK START CIRCUIT CONFIGURED TO CHARGE AND DISCHARGE A CAPACITOR TO CONTROL A POWER MODE

The present specification relates to systems, methods, apparatuses, devices, articles of manufacture and instructions for power control circuits.

SUMMARY

According to an example embodiment, a switching regulator circuit, comprising: a power supply input (Vin); a voltage reference (Vref); a power output (Vout); a high-side switch coupled between the power supply input (Vin) and the power output (Vout); a low-side switch coupled between a ground reference (GND) and the power output (Vout); a driver circuit coupled to the high-side switch and the low-side switch; a low-power comparator (COMP1) coupled to receive the voltage reference (Vref) and the power output (Vout); a high-power comparator (COMP2) having a first input and a second input; wherein the first input is coupled to a compensation capacitor (CC) and a first switch (SW1); wherein the second input is coupled to a current sense ramp; wherein the current sense ramp is coupled to the power output (Vout); wherein the first switch (SW1) is coupled to an error amplifier (EA); and wherein the error amplifier is coupled to receive the voltage reference (Vref) and the power output (Vout); a second switch (SW2) coupled to the low-power comparator (COMP1), the high-power comparator (COMP2), and the driver circuit; a controller coupled to the first switch (SW1) and the second switch (SW2); wherein the controller is configured to control the first switch (SW1) and the second switch (SW2) to place the switching regulator circuit in either a high-power mode or a low-power mode.

In another example embodiment, when the first switch (SW1) is open the compensation capacitor (CC) is prevented from being discharged through the error amplifier.

In another example embodiment, the controller is configured to place the switching regulator circuit in the high-power mode by increasing a time the high-side switch couples the power supply input (Vin) to the power output (Vout).

In another example embodiment, the controller is configured to place the switching regulator circuit in the low-power mode by decreasing the time the high-side switch couples the power supply input (Vin) to the power output (Vout).

In another example embodiment, in the low-power mode the controller is configured to disable the error amplifier (EA).

In another example embodiment, in the low-power mode the controller is configured to disable the error amplifier (EA), the high-power comparator (COMP2), and the current sense ramp and enable the low-power comparator (COMP1).

In another example embodiment, in the high-power mode the controller is configured to enable the error amplifier (EA), the high-power comparator (COMP2), and the current sense ramp, and disable the low-power comparator (COMP1).

In another example embodiment, further comprising a quick-start circuit coupled to the controller; wherein the quick-start circuit is configured to charge a set of capacitors when the switching regulator is in the low-power mode.

In another example embodiment, the set of capacitors are parasitic capacitors in the switching regulator circuit.

In another example embodiment, the quick-start circuit is configured to stop charging the set of parasitic capacitors when the switching regulator is in the high-power mode.

In another example embodiment, the set of capacitors are in the error amplifier (EA).

In another example embodiment, the set of capacitors are in the high-power comparator (COMP2) and the current sense ramp.

In another example embodiment, the quick-start circuit includes an inverter and a capacitor.

In another example embodiment, the quick-start circuit includes a one-shot and a mosfet.

In another example embodiment, further comprising a timer circuit; wherein the timer circuit is configured to periodically charge the compensation capacitor (CC) to a preset voltage during the low-power mode.

In another example embodiment, further comprising a timer circuit coupled to the first switch (SW1); wherein the timer circuit is configured to periodically close the first switch (SW1) during the low-power mode.

In another example embodiment, further comprising a timer circuit coupled to the first switch (SW1) and the error amplifier (EA); wherein in the low-power mode in a first time period the first switch (SW1) is open and the error amplifier (EA) is disabled; wherein in the low-power mode in a second time period the timer circuit closes the first switch (SW1) and enables the error amplifier (EA) for a predetermined time period; and wherein after the predetermined time period the timer circuit opens the first switch (SW1) and disables the error amplifier (EA).

In another example embodiment, further comprising an on-time control circuit coupled between the second switch (SW2) and the driver circuit; wherein the on-time control circuit is configured to control a time period when the high-side switch is turned on.

In another example embodiment, a voltage converter including the switching regulator circuit wherein the voltage converter is in a buck configuration.

In another example embodiment, a voltage converter including the switching regulator circuit wherein the voltage converter is in a boost configuration.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

BRIEF DESCRIPTION OF THE DRAWINGS

FIG. 2G represents an example timer circuit in the second example switching regulator.

FIG. 2H represents a second example timing diagram of the second example switching regulator in operation with the timer circuit.

Figure 1A:
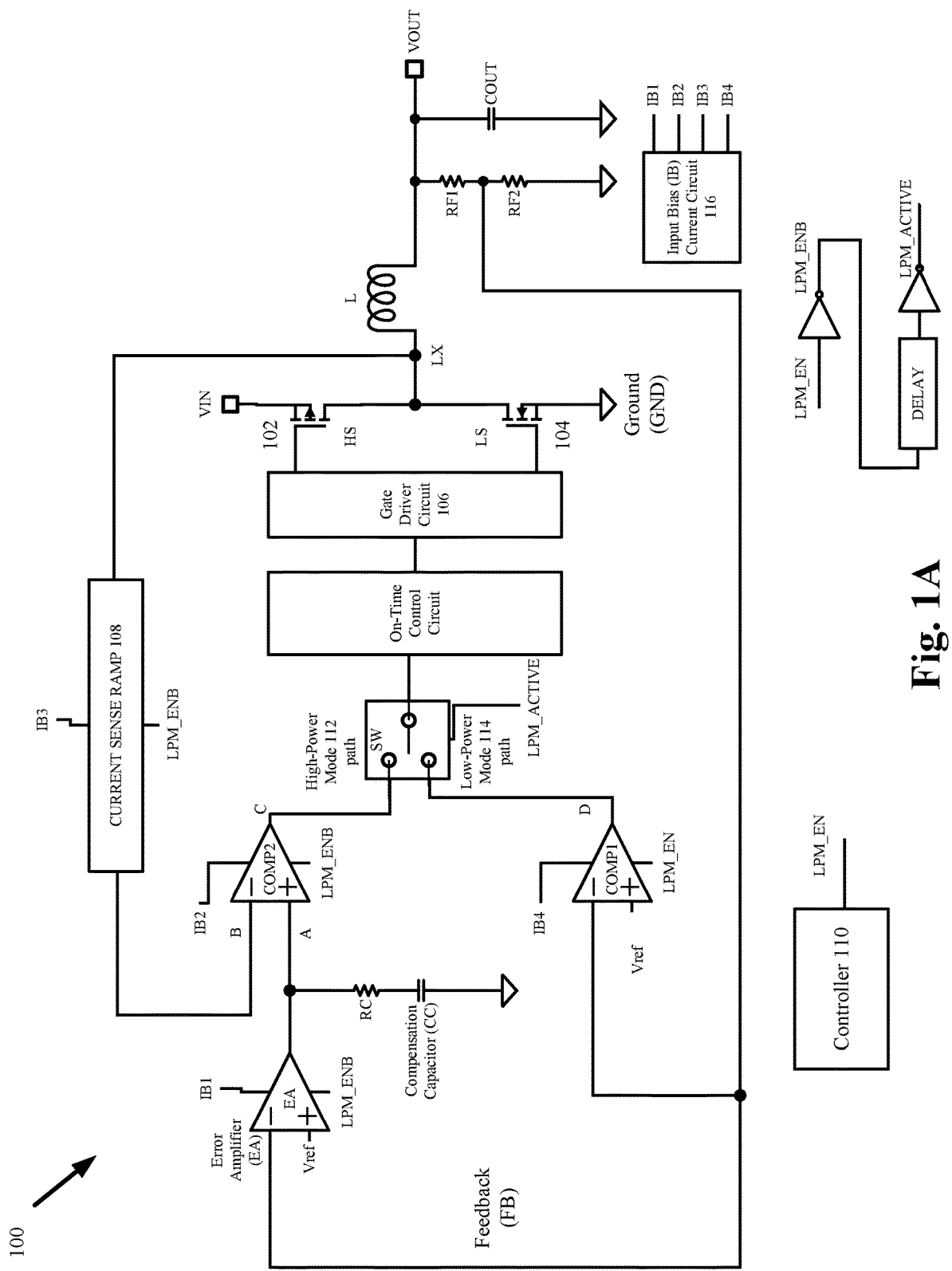
FIG. 1A represents a first example of a switching regulator.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

FIG. 1A represents a first example 100 of a switching regulator. The first example switching regulator 100 (e.g. within either a buck or boost DC-DC power converter) includes a set of high-power (e.g. micro-amp and higher) mode circuits and a set of low-power (e.g. nano-amp) mode circuits.

The first example switching regulator 100 includes a power supply input (Vin), a voltage reference input (Vref), a power output (Vout), a high-side switch 102, a low-side switch 104, a gate driver circuit 106, a low-power comparator (COMP1), a high-power comparator (COMP2), a compensation capacitor (CC), a switch (SW), a current sense ramp 108, an error amplifier (EA), a controller 110, and an input bias (IB) current circuit 116.

In some example embodiments, the Vref is tapped to the power output (Vout) through a feedback (FB) voltage through a resistor divider (e.g. RF1 and RF2 as shown in FIG. 1A). In various example embodiments the power supply input (Vin) is powering the entire switching regulator circuit.

The high-side switch 102 is coupled between the power supply input (Vin) and the power output (Vout). The low-side switch 104 is coupled between a ground reference (GND) and the power output (Vout). The gate driver circuit 106 is coupled to the high-side switch 102 and the low-side switch 104.

The low-power comparator (COMP1) is coupled to receive the voltage reference (Vref) and the power output (Vout). The high-power comparator (COMP2) includes a first input and a second input. The first input is coupled to the compensation capacitor (CC). The second input is coupled to the current sense ramp 108. The current sense ramp 108 is coupled to the power output (Vout). The compensation capacitor (CC) is coupled to the error amplifier (EA). The error amplifier (EA) is coupled to receive the voltage reference (Vref) and the power output (Vout). The switch (SW) is coupled to the low-power comparator (COMP1), the high-power comparator (COMP2), and the driver circuit;

The controller 110 is configured to generate a low-power mode enable signal (LPM_EN) which places the switching regulator 100 into a high-power mode 112 when the low-power mode enable signal (LPM_EN) is in a low state thus setting an LPM_ACTIVE signal to a low state causing the switch (SW) to couple the high-power comparator (COMP2) to the driver circuit 106 through the on-time control block.

The controller 110 is also configured to place the switching regulator 100 into a low-power mode 114 when the low-power mode enable signal (LPM_EN) is in a high state thus setting an LPM_ACTIVE signal to a high state causing the switch (SW) to couple the low-power comparator (COMP1) to the driver circuit 106 through the on-time control block.

Figure 1B:
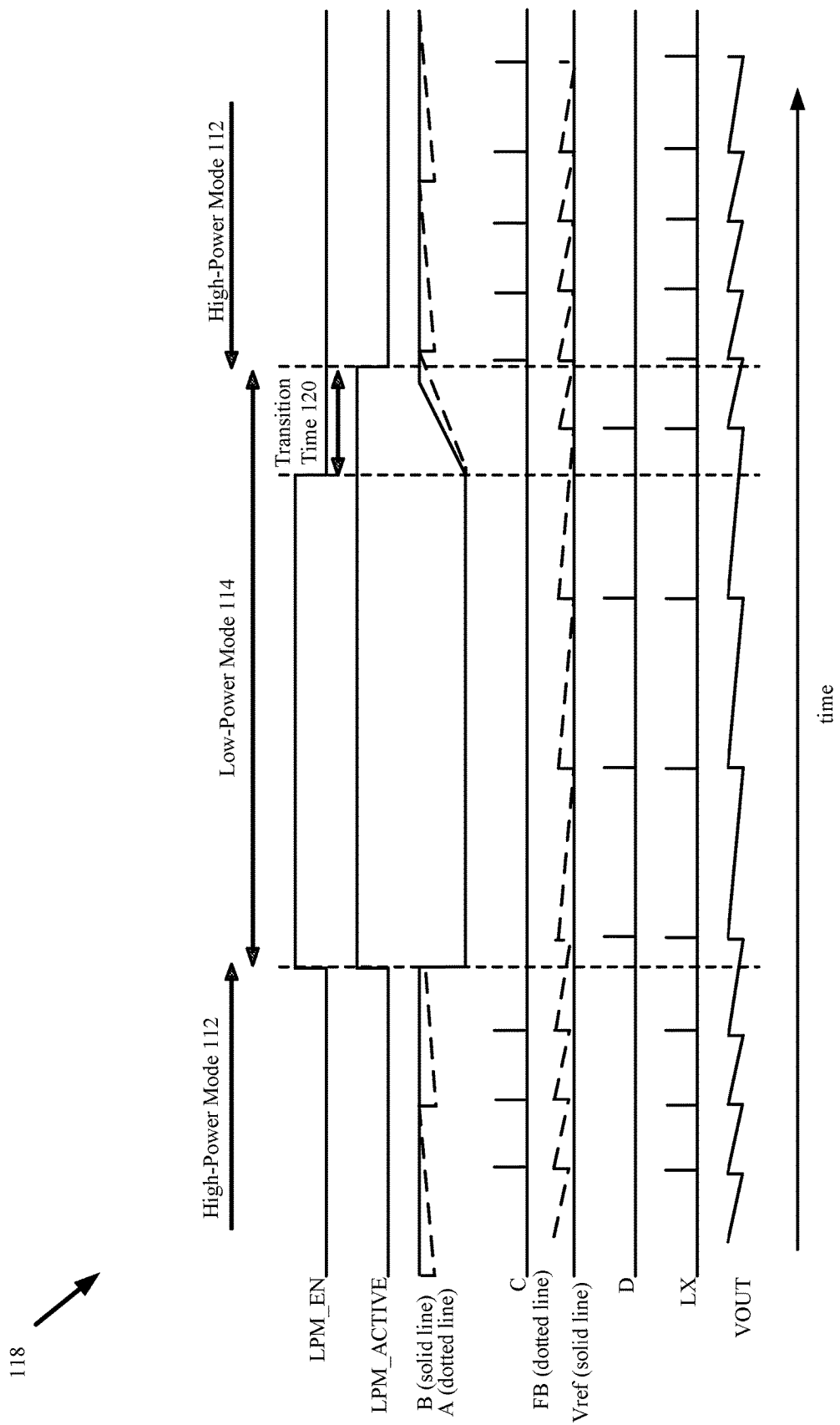
FIG. 1B represents an example timing diagram of the first example switching regulator in operation.

FIG. 1B represents an example timing diagram 118 of the first example switching regulator 100 in operation. The example timing diagram 118 shows the various identified signals from the first example switching regulator 100 transitioning between the high-power mode 112 (LPM_EN signal low) and the low-power mode 114 (LPM_EN signal high). Of note is a transition time 120 as the first example switching regulator 100 transitions from the low-power mode 114 back up to the high-power mode 112.

As shown in FIG. 1B, in the low-power mode 114 there are fewer current pulses (LX) over time due to a reduced/decreased time that the high-side switch 102 couples the power supply input (Vin) to the power output (Vout). While in the high-power mode 112 there are a greater number of current pulses (LX) over time due to an increased time that the high-side switch 102 couples the power supply input (Vin) to the power output (Vout).

The on-time control circuit coupled between the second switch (SW2) and the driver circuit controls the time that the high-side switch 102 couples the power supply input (Vin) to the power output (Vout) and a time that the low-side switch 104 couples a ground (GND) to the power output (Vout).

When the LPM_EN signal is low in the high-power mode 112 (also known as "normal mode") configuration, the switch (SW), the enable error amplifier (EA), the comparator COMP2 and the current sense ramp circuit 108 are enabled by the controller 110 and the comparator COMP1 is disabled by the controller 110 through the two inverter and the delay circuit as shown in FIG. 1A. The switch (SW) is also configured by the controller 110 to connect the output (C) of comparator COMP2 with on-time control circuit and the driver circuit 106. In the high-power mode 112, the switching regulator's 100 quiescent/standby current is on the order of several micro-amps.

When the LPM_EN signal is high in the low-power mode 114, the controller 110 enables the comparator COMP1 and disables the other circuits (e.g. error amplifier (EA), comparator COMP2, and current sense ramp circuit). The controller 110 configures the switch (SW) to connect the output (D) of comparator COMP1 with the on-time control circuit and the driver circuit 106. In the low-power mode 114, the comparator COMP1, the input bias (IB) current circuit 116, and Vref operate and the switching regulator's 100 quiescent/standby current is lower than micro-amps and on the order of nano-amps.

In the low-power mode 114 the error amplifier (EA) operates in nano-amps and upon a switch to the high-power mode 112 the compensation capacitor (CC) takes the transition time 120 time to charge. If the compensation capacitor (CC) is not fully charged, high-side switch 102 and low-side switch 104 switching will not maintain the output voltage for some load current increases connected to the power output (Vout). In other words, the transition time 120 is a time duration when the power output (Vout) cannot provide a heavy load current until the compensation capacitor (CC) is recharged.

Thus in some applications, the first example switching regulator 100 cannot be used if a load current coupled to the power output (Vout) increases too quickly when first example switching regulator 100 is changing from the low-power mode 114 to the high-power mode 112.

Figures 1C, 1D:
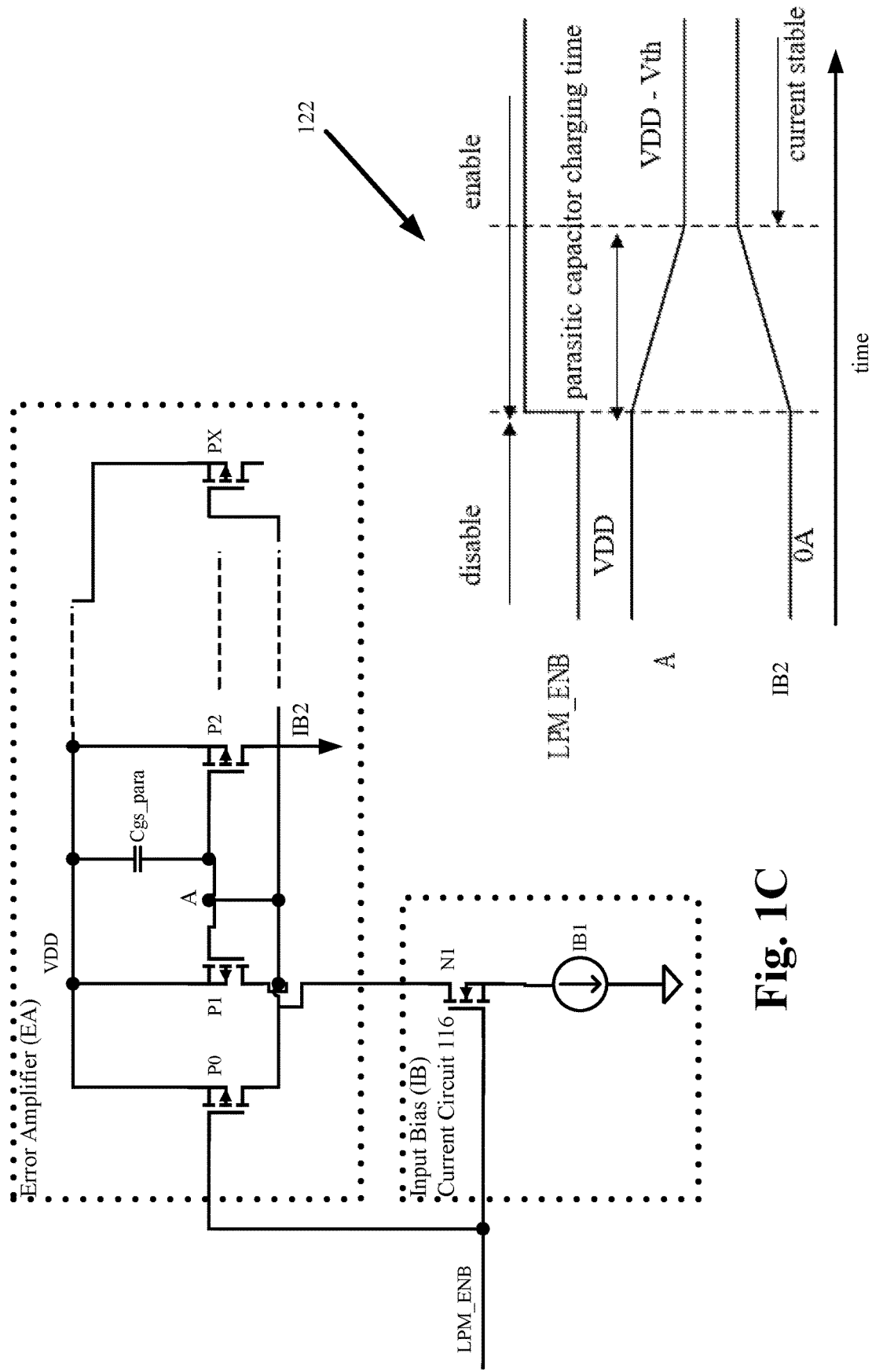
FIG. 1C represents an example of an input bias (IB) current circuit in the first example switching regulator.
FIG. 1D represents an example timing diagram of the input bias (IB) current circuit in the first example switching regulator in operation.

FIG. 1C represents an example of the input bias (IB) current circuit 116 in the first example switching regulator. FIG. 1D represents an example timing diagram 122 of the input bias (IB) current circuit 116 in the first example switching regulator in operation.

Note while only the input bias (IB) current circuit's 116 connection to the error amplifier (EA) is shown, the following description similarly applies to all circuit elements in the switching regulator 100 that receive input bias (IB) currents from the input bias (IB) current circuit's 116 as shown in FIG. 1A.

In the low-power mode 114 (LPM_EN signal high) since all circuits operate in nano-amps, bias currents from the input bias (IB) current circuit 116 need settling time when changing from low-power mode 114 to the high-power mode 112.

As shown, the input bias (IB) current circuit 116 is disabled when the LPM_ENB signal from the controller 110 is low. In this condition, P0 is ON and N1 is OFF, and the voltage of the parasitic capacitor Cgs_para between source and gate of PMOS is 0V.

However, when the LPM_ENB signal is set to high, P0 is OFF and N1 is ON, and current IB1 flows. At this time, the parasitic capacitor Cgs_para between source and gate of PMOS in the error amplifier (EA) begins to charge. When the parasitic capacitor is charged and reaches the threshold voltage of PMOS, the bias currents IB1 and IB2 are stable.

Thus in the first switching regulator 100, the error amplifier (EA), the comparator (COMP2), and the current sense ramp circuit 108 cannot operate as soon as the LPM_ENB signal becomes high because these bias currents (IB1, IB2, IB3, IB4) from the input bias (IB) current circuit 116 need time to stabilize. The error amplifier (EA), the comparator (COMP2), and the current sense ramp circuit 108 operate normally after their respective parasitic capacitors are charged.

Now discussed is are additional embodiments of the switching regulator circuit that have a faster low-power mode to high-power mode transition time. These additional embodiments of the switching regulator circuit can be used in applications in which a load current coupled to the switching regulator increases when changing low-power mode to high-power mode.

Figure 2A:
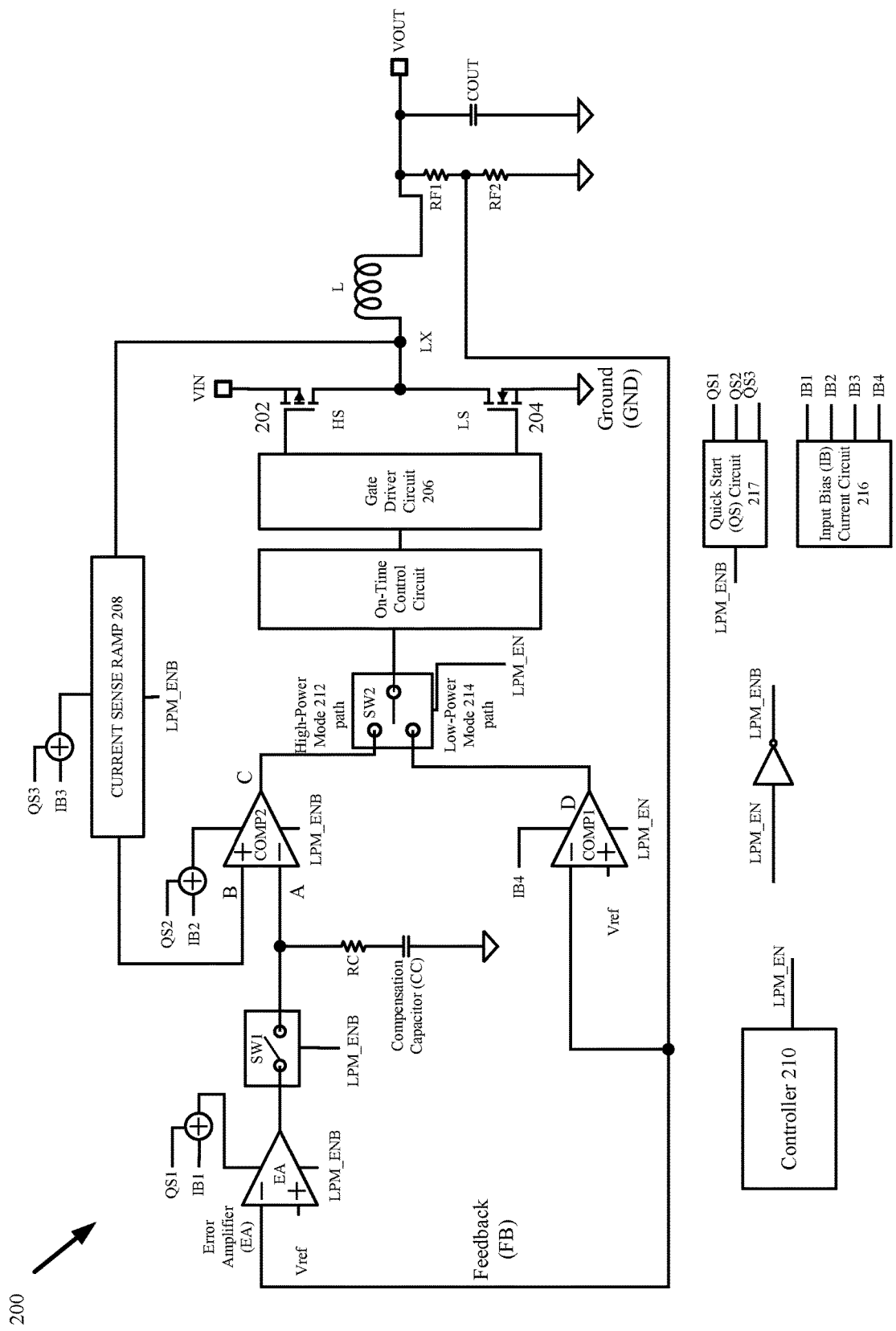
FIG. 2A represents a second example of the switching regulator.

FIG. 2A represents a second example 200 of the switching regulator. The second example switching regulator 200 also includes a set of high-power (e.g. micro-amp and higher) mode circuits and a set of low-power (e.g. nano-amp) mode circuits.

The second example switching regulator 200 includes a power supply input (Vin), a voltage reference input (Vref), a power output (Vout), a high-side switch 202, a low-side switch 204, a gate driver circuit 206, a low-power comparator (COMP1), a high-power comparator (COMP2), a compensation capacitor (CC), a first switch (SW1), a current sense ramp 208, an error amplifier (EA), a second switch (SW2), a controller 210, quick start circuit 217, and an input bias (IB) current circuit 216.

In some example embodiments, the Vref is tapped to the power output (Vout) through a feedback (FB) voltage through a resistor divider (e.g. RF1 and RF2 as shown in FIG. 2A). In various example embodiments the power supply input (Vin) is powering the entire switching regulator circuit.

The high-side switch 202 is coupled between the power supply input (Vin) and the power output (Vout). The low-side switch 204 is coupled between a ground reference (GND) and the power output (Vout). The gate driver circuit 206 is coupled to the high-side switch 202 and the low-side switch 204.

The low-power comparator (COMP1) is coupled to receive the voltage reference (Vref) and the power output (Vout). The high-power comparator (COMP2) includes a first input and a second input. The first input is coupled to the compensation capacitor (CC) and the first switch (SW1). The second input is coupled to the current sense ramp 208. The current sense ramp 208 is coupled to the power output (Vout). The first switch (SW1) is coupled to the error amplifier (EA). The error amplifier (EA) is coupled to receive the voltage reference (Vref) and the power output (Vout). The second switch (SW2) is coupled to the low-power comparator (COMP1), the high-power comparator (COMP2), and the driver circuit 206.

In a low to high mode transition, the controller 210 is configured to generate a low-power mode enable signal (LPM_EN) which places the switching regulator 200 into a high-power mode 212 when the low-power mode enable signal (LPM_EN) is in a low state thus causing the second switch (SW2) to couple the high-power comparator (COMP2) to the driver circuit 206 through the on-time control block.

An inverter converts the low-power mode enable signal (LPM_EN) low signal to its complement LPM_ENB which is a high signal thus enabling the error amplifier (EA), the high-power comparator (COMP2), and the current sense ramp 208. The LPM_ENB signal also closes the first switch (SW1) to couple the error amplifier (EA) to the compensation capacitor (CC).

In a high to low mode transition, the controller 210 is configured to place the switching regulator 200 into a low-power mode 214 when the low-power mode enable signal (LPM_EN) is in a high state thus enabling the low-power comparator (COMP1) and causing the second switch (SW2) to couple the low-power comparator (COMP1) to the driver circuit 206 through the on-time control block.

The inverter then converts the low-power mode enable signal (LPM_EN) high signal to its complement LPM_ENB which is a low signal thus disabling the error amplifier (EA), the high-power comparator (COMP2), and the current sense ramp 208. The LPM_ENB signal also opens the first switch (SW1) to prevent the error amplifier (EA) from discharging the compensation capacitor (CC).

Figure 2B:
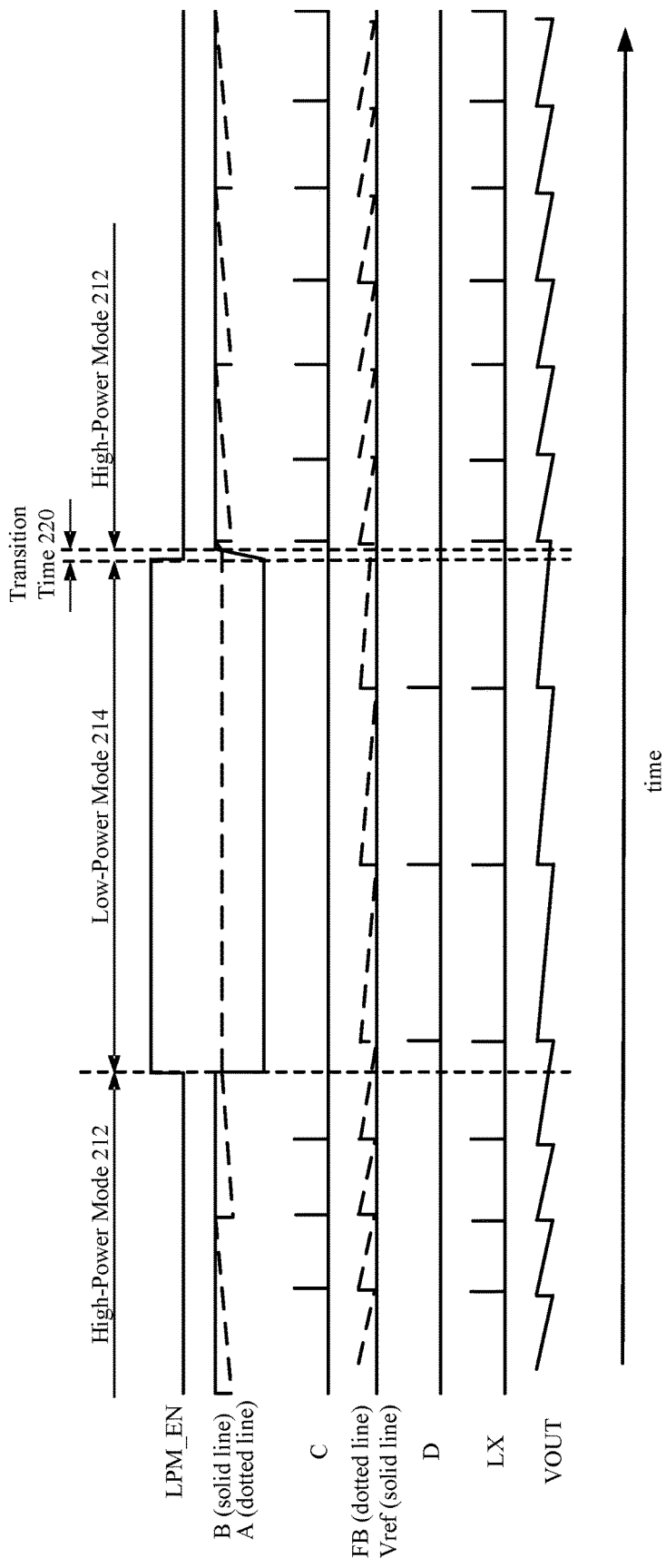
FIG. 2B represents a first example timing diagram of the second example switching regulator in operation.

FIG. 2B represents an example timing diagram 218 of the second example switching regulator 200 in operation. The example timing diagram 218 shows the various identified signals from the second example switching regulator 200 transitioning between the high-power mode 212 (LPM_EN signal low) and the low-power mode 214 (LPM_EN signal high). Of note is a transition time 220 as the second example switching regulator 200 transitions from the low-power mode 214 back up to the high-power mode 212. The transition time 220 as the second example switching regulator 200 is shorter than transition time 120 as the first example switching regulator 100.

As shown in FIG. 2B, in the low-power mode 214 there are fewer current pulses (LX) over time due to a reduced/ decreased time that the high-side switch 202 couples the power supply input (Vin) to the power output (Vout). While in the high-power mode 212 there are a greater number of current pulses (LX) over time due to an increased time that the high-side switch 202 couples the power supply input (Vin) to the power output (Vout).

The on-time control circuit coupled between the second switch (SW2) and the driver circuit controls the time that the high-side switch 202 couples the power supply input (Vin) to the power output (Vout) and a time that the low-side switch 204 couples a ground (GND) to the power output (Vout).

The faster transition time 220 between the low-power (e.g. nano-amp) mode 214 to high-power (e.g. micro-amp and higher) mode 212 is a achieved through a combination of the first switch (SW1) for preventing the compensation capacitor (CC) from being discharged while in low-power mode 214, a timer circuit (see FIG. 2H) for keeping the compensation capacitor (CC) charged over long periods in the low-power mode 214, and the quick start circuit (QS) 217 keeping various parasitic capacitors charged during the low-power mode 214.

As shown in FIG. 2B and discussed above, when the controller 210 sets the LPM_EN signal to high, this enables the low-power comparator (COMP1) to operate in the low-power mode 214 and disables various other circuits. The second switch (SW2) connects the output of the low-power comparator (COMP1) with the gate driver circuit 206 through the on-time control circuit. The first switch (SW1) is open so that the voltage on the compensation capacitor (CC) is not drained by the error amplifier (EA). In this was the quiescent/standby current the switching regulator 200 stays in the nano-amp range.

When the controller 210 sets the LPM_EN signal to low, then the enable error amplifier (EA), the comparator (COMP2) and current sense ramp 208 operate and the low-power comparator (COMP1) is disabled. The switch SW2 connects the output of comparator (COMP2) with the gate driver circuit 206 through the on-time control circuit. The first switch (SW1) is closed and connects the compensation capacitor (CC) to the output of error amplifier (EA).

Since previously in the low-power mode 214 (LPM_EN signal high), the voltage on the compensation capacitor (CC) was maintained since the first switch (SW1) was opened. Thus the time for any additional charging of the compensation capacitor (CC) by the error amplifier (EA) is very short.

Figures 2C, 2D:
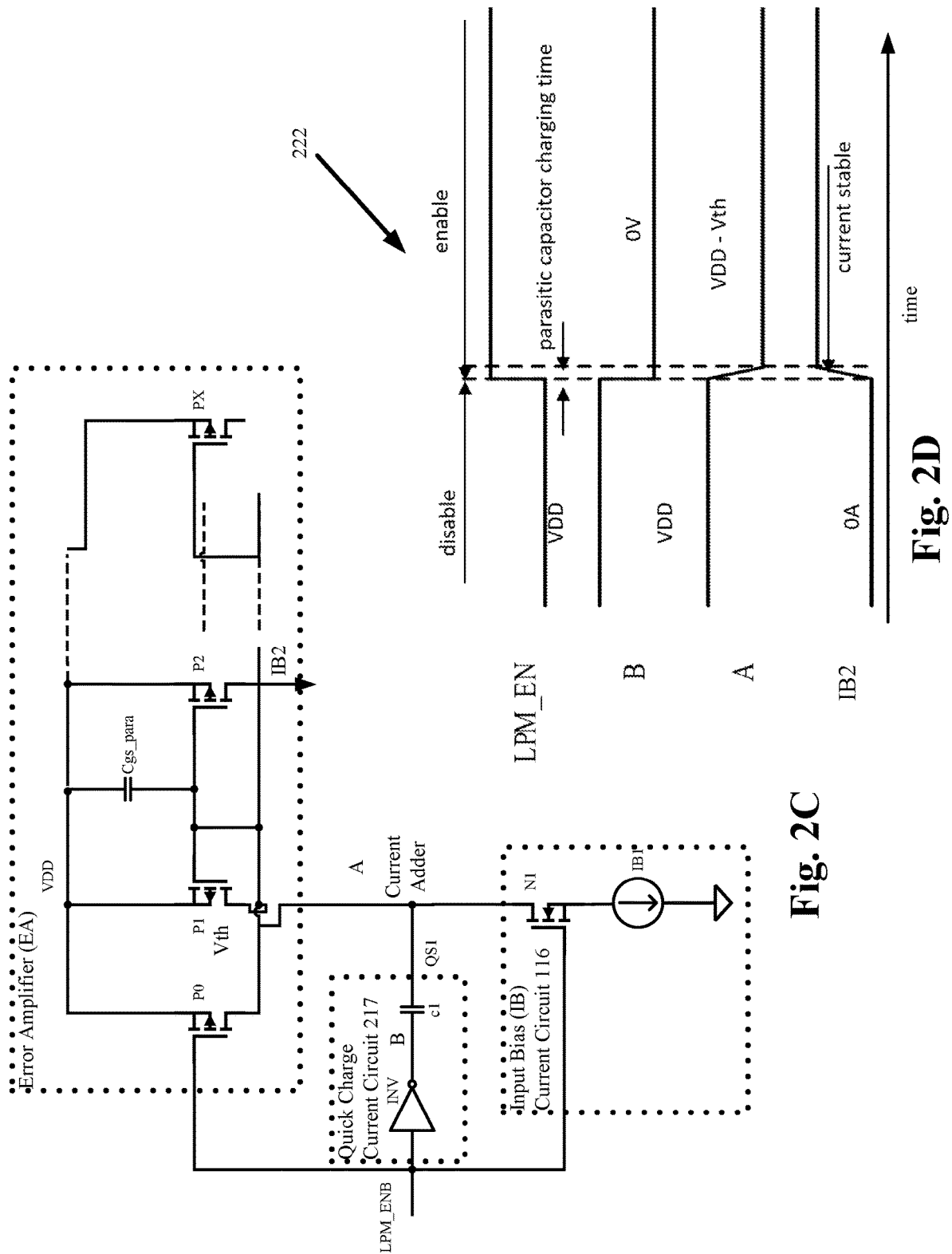
FIG. 2C represents an example first quick start circuit in the second example switching regulator.
FIG. 2D represents an example timing diagram of the first quick start circuit in the second example switching regulator in operation.

FIG. 2C represents an example first quick start circuit 217 in the second example switching regulator 200. FIG. 2D represents an example timing diagram 222 of the first quick start circuit 217 in the second example switching regulator 200 in operation.

Note while only the input bias (IB) current circuit's 216 connection to the error amplifier (EA) is shown, the following description similarly applies to all circuit elements in the switching regulator 200 that receive input bias (IB) currents from the input bias (IB) current circuit's 216 as shown in FIG. 2A.

In the low-power mode 214 (LPM_EN signal high) since all circuits operate in nano-amps, bias currents from the input bias (IB) current circuit 216 need settling time when changing from low-power mode 214 to the high-power mode 212.

The first quick start circuit 217 circuit quickly charges the parasitic capacitor Cgs_para and reduce the settling time of current.

As shown, when the switching regulator 200 is in the low-power mode 214, the LPM_EN signal is set to high and the LPM_ENB signal is set to low through the inverter discussed in FIG. 2A; however, a second inverter (INV) in the first quick start circuit 217 sets a signal at point (B) to high. In this condition, P0 is ON and N1 is OFF, and the voltage of the parasitic capacitor Cgs_para between source and gate of PMOS (P1, P2, . . . . PX) in the error amplifier (EA) is 0V. Since node A and node B are both VDD, the charged voltage of capacitor C1 is 0V.

When the switching regulator 200 is in the high-power mode 212, the LPM_EN signal is set to low and the LPM_ENB signal is set to high through the inverter discussed in FIG. 2A; however, a second inverter (INV) in the first quick start circuit 217 sets a signal at point (B) to low. In this condition, P0 is OFF and N1 is ON, and current IB1 flows through N1. Since the charged voltage of capacitor C1 is 0V and the output of inverter INV (node B) becomes low, the voltage of node A rapidly decreases by C1 (i.e. node A decreases because the capacitor has the characteristic of keep the charged voltage) and the parasitic capacitor Cgs_para is quickly charged (i.e. C1 decreases node A to charger Cgs_para). The bias current IB2 is quickly stabilized so that the error amplifier (EA) can operate immediately when the controller 210 places the switching regulator back in the high-power mode 212.

Thus in the second switching regulator 200, the error amplifier (EA), the comparator (COMP2), and the current sense ramp circuit 208 can operate as soon as the LPM_ENB signal becomes high because these bias currents (IB1, IB2, IB3, IB4) from the input bias (IB) current circuit 116 have already been stabilized by the first quick start circuit 217.

Figures 2E, 2F:
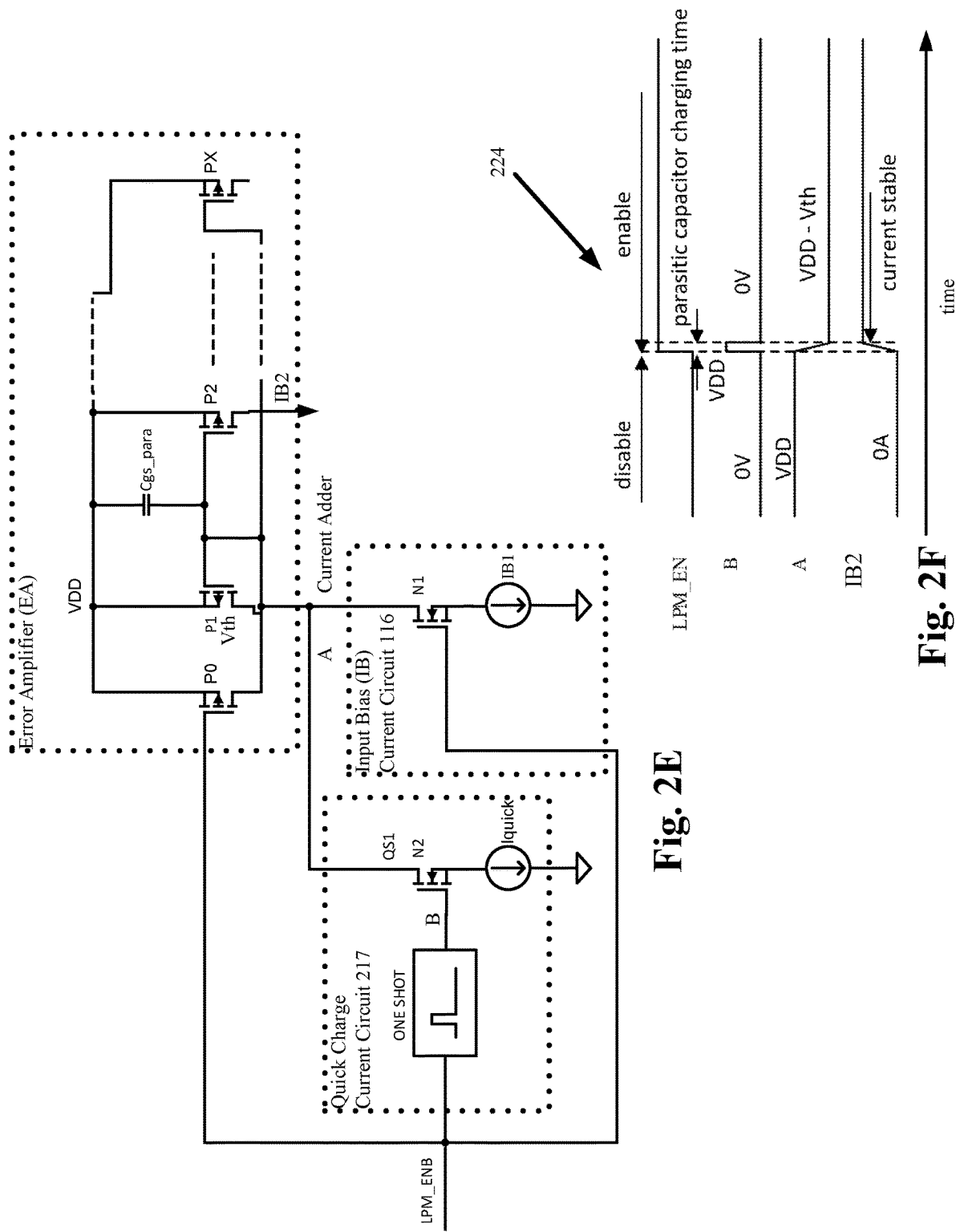
FIG. 2E represents an example second quick start circuit in the second example switching regulator.
FIG. 2F represents an example timing diagram of the second quick start circuit in the second example switching regulator in operation.

FIG. 2E represents an example second quick start circuit 217 in the second example switching regulator 200. FIG. 2F represents an example timing diagram 224 of the second quick start circuit 217 in the second example switching regulator 200 in operation.

The first and second quick start circuits 217 operate substantially similarly, except that the inverter (INV) and capacitor (C1) of the first quick start circuit 217 has been replaced with a one-shot and a MOSFET (N2) in the second quick start circuit 217.

In the second quick start circuit 217 when LPM_ENB is low, P0 is ON and N1 is OFF, and the voltage of the parasitic capacitor Cgs_para between source and gate of PMOS in the error amplifier (EA) is 0V.

When LPM_ENB becomes high, P0 is OFF and N1 is ON, and current IB1 flows through N1. At a same time, the output voltage of ONE SHOT becomes high for a certain period of time and N2 is on. The current Iquick flowing to N2 charges the parasitic capacitor Cgs_para in the error amplifier (EA) quickly. The bias current IB2 is also quickly stabilized so that circuits can operate immediately.

FIG. 2G represents an example timer circuit 226 in the second example switching regulator. Mention of the timer circuit 226 was first made in the FIGS. 2A and 2B discussion as keeping the compensation capacitor (CC) charged over long periods in the low-power mode 214. In the timer circuit 226 configuration the controller 210 generates an LPM low-power mode 214 signal. LPM is set to low indicates the high-power mode 212 and LPM set to high indicates the low-power mode 214. The timer circuit 226 includes a timer 228 and a logic AND gate 230.

FIG. 2H represents a second example timing diagram 232 of the second example switching regulator 200 in operation with the timer circuit 226. The timer circuit 226 is configured to periodically operate to keep the compensation capacitor (CC) charged even when the switching regulator 200 is in the low-power mode 214.

If the low-power mode 214 continues for a long time, then the voltage of compensation capacitor (CC) will be discharged by various leakage currents. If the compensation capacitor (CC) became discharged, the transition time 220 would not be as short when the switching regulator 200 changes from the low-power mode 214 to the high-power mode 212.

Thus in various example embodiments, if the low-power mode 214 continues for a predetermined (e.g. long) time set by the timer 228, the timer circuit 226 causes (i.e. periodic low signal) the error amplifier (EA) to briefly operate in high-power mode 212. As a result, the compensation capacitor (CC) maintains its voltage before the first switch (SW1) is opened.

Various instructions and/or operational steps discussed in the above Figures can be executed in any order, unless a specific order is explicitly stated. Also, those skilled in the art will recognize that while some example sets of operational steps have been discussed, the material in this specification can be combined in a variety of ways to yield other examples as well, and are to be understood within a context provided by this detailed description.

In some example embodiments these operational steps can be wholly or partially implemented as functional and software instructions. In other embodiments, the operational steps can be implemented with functional equivalents, perhaps including logic gates, application specific chips, firmware, as well as other hardware.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A switching regulator circuit, comprising:
a power supply input;
a voltage reference;
a power output;
a high-side switch coupled between the power supply input and the power output;
a low-side switch coupled between a ground reference and the power output;
a driver circuit coupled to the high-side switch and the low-side switch;
a low-power comparator coupled to receive the voltage reference and the power output;
a high-power comparator having a first input and a second input;
wherein the first input is coupled to a compensation capacitor and a first switch;
wherein the second input is coupled to a current sense ramp;
wherein the current sense ramp is coupled to the power output;
wherein the first switch is coupled to an error amplifier; and
wherein the error amplifier is coupled to receive the voltage reference and the power output;
a second switch coupled to the low-power comparator, the high-power comparator, and the driver circuit;
a controller coupled to the first switch and the second switch;
wherein the controller is configured to control the first switch and the second switch to place the switching regulator circuit in either a high-power mode or a low-power mode.

2. The switching regulator circuit of claim 1:
wherein when the first switch is open the compensation capacitor is prevented from being discharged through the error amplifier.

3. The switching regulator circuit of claim 1:
wherein the controller is configured to place the switching regulator circuit in the high-power mode by increasing a time the high-side switch couples the power supply input to the power output.

4. The switching regulator circuit of claim 3:
wherein the controller is configured to place the switching regulator circuit in the low-power mode by decreasing the time the high-side switch couples the power supply input to the power output.

5. The switching regulator circuit of claim 1:
wherein in the low-power mode the controller is configured to disable the error amplifier.

6. The switching regulator circuit of claim 1:
wherein in the low-power mode the controller is configured to disable the error amplifier, the high-power comparator, and the current sense ramp and enable the low-power comparator.

7. The switching regulator circuit of claim 1:
wherein in the high-power mode the controller is configured to enable the error amplifier, the high-power comparator, and the current sense ramp, and disable the low-power comparator.

8. The switching regulator circuit of claim 1:
further comprising a quick-start circuit coupled to the controller;
wherein the quick-start circuit is configured to charge a set of capacitors when the switching regulator is in the low-power mode.

9. The switching regulator circuit of claim 8:
wherein the set of capacitors are parasitic capacitors in the switching regulator circuit.

10. The switching regulator circuit of claim 8:
wherein the quick-start circuit is configured to stop charging the set of parasitic capacitors when the switching regulator is in the high-power mode.

11. The switching regulator circuit of claim 8:
wherein the set of capacitors are in the error amplifier.

12. The switching regulator circuit of claim 8:
wherein the set of capacitors are in the high-power comparator and the current sense ramp.

13. The switching regulator circuit of claim 8:
wherein the quick-start circuit includes an inverter and a capacitor.

14. The switching regulator circuit of claim 8:
wherein the quick-start circuit includes a one-shot and a mosfet.

15. The switching regulator circuit of claim 1:
further comprising a timer circuit;
wherein the timer circuit is configured to periodically charge the compensation capacitor to a preset voltage during the low-power mode.

16. The switching regulator circuit of claim 1:
further comprising a timer circuit coupled to the first switch;
wherein the timer circuit is configured to periodically close the first switch during the low-power mode.

17. The switching regulator circuit of claim 1:
further comprising a timer circuit coupled to the first switch and the error amplifier;
wherein in the low-power mode in a first time period the first switch is open and the error amplifier is disabled;
wherein in the low-power mode in a second time period the timer circuit closes the first switch and enables the error amplifier for a predetermined time period; and
wherein after the predetermined time period the timer circuit opens the first switch and disables the error amplifier.

18. The switching regulator circuit of claim 1:
further comprising an on-time control circuit coupled between the second switch and the driver circuit;
wherein the on-time control circuit is configured to control a time period when the high-side switch is turned on.

19. A voltage converter including the switching regulator circuit of claim 1:
wherein the voltage converter is in a buck configuration.

20. A voltage converter including the switching regulator circuit of claim 1:
wherein the voltage converter is in a boost configuration.

* * * * *